(12) United States Patent
Kaminer et al.

(10) Patent No.: US 11,828,890 B2
(45) Date of Patent: Nov. 28, 2023

(54) SCINTILLATOR STRUCTURE AND A METHOD FOR EMITTING AN OUTPUT SIGNAL AT A SPECIFIC WAVELENGTH RANGE

(71) Applicant: Technion Research and Development Foundation Ltd., Haifa (IL)

(72) Inventors: Ido Kaminer, Haifa (IL); Yaniv Kurman, Haifa (IL); Raphael Dahan, Moshav Gan Hashomron (IL); Orr Beer, Haifa (IL)

(73) Assignee: TECHNION RESEARCH AND DEVELOPMENT FOUNDATION LTD., Haifa (IL)

( * ) Notice: Subject to any disclaimer, the term of this patent is extended or adjusted under 35 U.S.C. 154(b) by 0 days.

(21) Appl. No.: 17/767,790

(22) PCT Filed: Sep. 30, 2020

(86) PCT No.: PCT/IL2020/051063
§ 371 (c)(1),
(2) Date: Apr. 8, 2022

(87) PCT Pub. No.: WO2021/070175
PCT Pub. Date: Apr. 15, 2021

(65) Prior Publication Data
US 2022/0390625 A1 Dec. 8, 2022

Related U.S. Application Data

(60) Provisional application No. 62/913,298, filed on Oct. 10, 2019.

(51) Int. Cl.
*G01T 1/20* (2006.01)
*G01T 1/202* (2006.01)

(52) U.S. Cl.
CPC ............ *G01T 1/2018* (2013.01); *G01T 1/202* (2013.01)

(58) Field of Classification Search
None
See application file for complete search history.

(56) References Cited

U.S. PATENT DOCUMENTS

| 6,795,199 B2 | 9/2004 | Suhami |
| 7,304,309 B2 | 12/2007 | Suhami |

(Continued)

FOREIGN PATENT DOCUMENTS

| CN | 104035121 A | 9/2014 |
| EP | 3502750 A1 | 6/2019 |

OTHER PUBLICATIONS

Yablonovitch, E. (1987). Inhibited spontaneous emission in solid-state physics and electronics. Physical review letters, 58(20), 2059.

(Continued)

*Primary Examiner* — Edwin C Gunberg
(74) *Attorney, Agent, or Firm* — BROWDY AND NEIMARK, P.L.L.C.

(57) ABSTRACT

The present invention discloses a scintillator structure and to a method for producing an output optical signal at a specific wavelength range. The scintillator structure comprises a multilayer nanostructure formed by at least one pair of alternating first and second layered material being arranged along one or more principal axes. The multi-layer nanostructure defines predetermined geometrical parameters and the structure is made of at least two different material compositions. At least one of the first layered material, the second layered material, or the combination of both, define scintillation properties. The invention also discloses a detector system for detecting an input radiation comprising a scintillator structure being as defined above and being (Continued)

configured and operable to collect most of the emitted optical signal.

7 Claims, 6 Drawing Sheets

(56) References Cited

U.S. PATENT DOCUMENTS

| | | |
|---|---|---|
| 7,863,579 B2 | 1/2011 | Suhami |
| 9,103,921 B2 | 8/2015 | Torres et al. |
| 9,377,542 B1 | 6/2016 | Nagarkar et al. |
| 9,650,569 B1 | 5/2017 | Cohen et al. |
| 10,365,383 B2 | 7/2019 | Nelson et al. |
| 2009/0045348 A1* | 2/2009 | Stuenkel .................. G01T 3/06 250/390.11 |
| 2015/0241579 A1 | 8/2015 | Menge |
| 2017/0276836 A1 | 9/2017 | Soci et al. |
| 2019/0025441 A1* | 1/2019 | Radivojevic .......... G01T 1/2018 |

OTHER PUBLICATIONS

Novotny, L., & Hecht, B. (2012). Principles of nano-optics. Cambridge university press, p. 247.

Supplementary European Search Report issued in corresponding European Application No. 20874588, dated Nov. 10, 2022.

* cited by examiner

SCINTILLATOR STRUCTURE AND A METHOD FOR EMITTING AN OUTPUT SIGNAL AT A SPECIFIC WAVELENGTH RANGE

TECHNOLOGICAL FIELD

The present disclosure is generally directed to scintillator structures and techniques employing scintillator structures.

BACKGROUND ART

References considered to be relevant as background to the presently disclosed subject matter are listed below:
1. U.S. Pat. No. 10,365,383;
2. U.S. Pat. No. 9,650,569;
3. U.S. Pat. No. 9,377,542;
4. U.S. Pat. No. 9,103,921;
5. U.S. Pat. No. 7,863,579;
6. U.S. Pat. No. 7,304,309;
7. U.S. Pat. No. 6,795,199;
8. Yablonovitch, E. (1987). Inhibited spontaneous emission in solid-state physics and electronics. *Physical review letters*, 58(20), 2059;
9. Novotny, L., & Hecht, B. (2012). *Principles of nano-optics*. Cambridge university press, page 247.

Acknowledgement of the above references herein is not to be inferred as meaning that these are in any way relevant to the patentability of the presently disclosed subject matter.

BACKGROUND

A scintillation detector or scintillation counter is obtained when a scintillation material is coupled to an electronic light sensor such as a photomultiplier tube (PMT), photodiode, silicon photomultiplier, and the like. Photomultiplier tubes absorb the light emitted by the scintillation material and convert it to an electron current via the photoelectric effect. The subsequent multiplication of those electrons (sometimes called photoelectrons) results in an electrical pulse which can then be analyzed, and which yields meaningful information on the radiation that originally struck the scintillation material. A scintillator is a material that produces light when excited by an energetic excitation, such as alpha or beta particles, X-ray to Gamma-ray radiation, or free electrons. The scintillator efficiently converts the excitation's energy into light in the optical range via luminescence centers, so that the emitted light intensity is proportional to the excitation's energy. As a result, scintillation-based detectors are widely used in medical imaging modalities, light intensifiers, electron microscopes, and particle accelerator facilities, as converters for energetic excitations into a detectable signal. Some examples of non-invasive tomographic medical applications using scintillation-based detectors include X-ray imaging, computerized tomography, and positron emission tomography scanning systems.

GENERAL DESCRIPTION

The energy is converted in scintillators in the following manner: the energetic radiation produces a single photoelectric electron or one or more Compton electrons, which then excite many electron-hole pairs that thermalize until reaching luminescence centers, where each pair can recombine radiatively by emitting less energetic photonic radiation through spontaneous emission, which is the desired detectable signal. Thus, the detection of energetic radiation through a scintillation process has generally five steps: (1) the incoming radiation energy is converted via the photoelectric effect into a single photoelectric electron or one or more Compton electrons; (2) the energetic electron produces a large number of excited charge carriers in the material; (3) the charge carriers thermalize and reach luminescence centers; (4) the luminescence centers perform radiative emission of easily detected radiation through spontaneous emission (similar to LED); (5) the emitted radiation is detected using standard detectors (e.g., a silicon photomultiplier detector). In every one of the five steps described above, there is a typical timescale and efficiency that limits the overall efficiency and time detection resolution. The previous solutions proposed, to overcome the above-mentioned problems of overall efficiency and time detection resolution, include to reduce the timescales of step (5) above with better silicon photodetectors, enhancing steps (1), (2), and (3) by choosing specific materials (heavy materials), or improving the connection between steps (4) and (5) with impedance matching for radiation. However, the efficiency and time scale of step (4) is currently the main bottleneck of the overall process, since the typical timescales of radiative emission (once step (3) is done) is in the order of nanoseconds or slower. In addition, the radiation that is created in step (4) is emitted in all directions, but only some portion of the emitted radiation is extracted from the scintillator and reaches step (5), since most of the radiation is emitted into non-relevant directions, or reflected. Some solutions tried to skip steps (2), (3), and (4) by directly connecting step (1) to step (5) via Cherenkov emission, though this process is profoundly inefficiency. Other solutions for improving step (4) propose to reduce the timescales by increasing the emission frequency to the UV range, or to coat the scintillator with nanostructures that extract radiation more efficiently from the scintillator to the photodetector. However, the faster UV signal has low detection probability by the silicon PMT due to its limited spectral response, while the coating solution can improve the out-coupling only to the radiation which was emitted in step (4) towards the silicon PMT, that is, improve the connection between steps (4) and (5) rather than changing the emission process itself. The limited timescales of the overall process limit applications such as: PET scan resolution, X-ray camera temporal resolution and high-energy particle identification. Moreover, the limited efficiency defined as the number of photons that reach step (5) out of all the radiation emitted in step (4), limits the resolution and sensitivity of most of the X-ray applications. Moreover, scintillators are generally limited by the intrinsic isotropy of spontaneous emission of the scintillation radiation and its inefficient outcoupling.

The present invention overcomes the above-mentioned problem and enables to detect incoming radiation with high efficiency and at a high time resolution by enhancing the amount radiation that is emitted, as well as providing faster timing of the radiation creation. Therefore, the technique of the present invention may be used for high-energy radiation detection and/or radiation emission. The scintillator structure of the present invention may be exposed to any source generating the incoming radiation which may be photons with any wavelength smaller than the emission wavelength range (e.g. X-ray photons, Gamma-ray photons, or UV) or alternatively particles (e.g. energetic free electrons muons, or ions). In other words, both the number of extracted photons, and their time of arrival to the detector, are enhanced in the scintillator structure of the present invention. In some embodiments, the scintillator structure of the present invention is configured and operable to mold the shape of emitted radiation to enhance X-Ray and/or γ-Ray Detection.

According to a broad aspect of the present invention, there is provided a scintillator structure comprising a multilayer nanostructure formed by at least one pair of alternating first and second layered material being arranged along one or more principal axes. The multi-layer nanostructure defines predetermined geometrical parameters and the structure is made of at least two different material compositions. At least one of the first layered material, the second layered material, or the combination of both, define scintillation properties. The term "scintillation properties" refers hereinafter to the properties of stopping an input radiation and converting its energy into an output optical signal of a predetermined range of wavelengths. Moreover, by appropriately selecting the geometrical dimensions of the material with scintillation properties and the material without scintillation properties, enables to control the emission rate of the output optical signal and the directionality of the optical signal emission.

More generally, the materials and dimensions of the structure of the present invention can be selected to fit every emission spectral distribution by "stretching" and "shifting" the same typical photonic band structure. As a rule of thumb, a larger retractive index contrast between the two materials in the structure, increases the potential advantages from the structure properties. Interestingly, control over the emission angles is possible even in unintuitive cases, such as when the scintillator material (i.e. first layered material) has a lower refractive index than the other material(s) (i.e. second layered material) used to create the structure of the present invention. Additionally, even if the surrounding material has a larger refractive index compared to the scintillation material (for example a silicon chip detector) so that the original outcoupling is efficient, the present invention can be used for enhancing the emission rate and by that reduce the overall detection timing.

Such emission may be part of photoluminescence and/or phosphorescence and/or cathodoluminescence processes. Specifically, the structure of the present invention can enable to convert radiation from one wavelength range to another wavelength range by photoluminescence and by phosphors enhancing the emission rate and angular distribution of the radiation emission. The material without the scintillation properties (i.e. the second layered material) is a "passive" material being configured, together with the first scintillator material, to shape the emitted light and to thereby control the emission rate of the output optical signal and the directionality of the optical signal emission. The predetermined spontaneous emission wavelength range of the scintillator structure of the present invention is material dependent and can be in any wavelength range in the range of between about 50 nanometers in the ultraviolet (UV) range and about 10 microns in the infra-red (IR). The material composition and geometrical parameters of each layered material in the whole structure is selected to control the emission rate of the output optical signal and the directionality of the optical signal emission, such that the output signal propagation direction is oriented along the one or more principal axes. The second layered material has a refractive index being different from the refractive index of the first layered material, in order to shape the wave form of the emitted radiation itself to become concentrated inside the scintillation material. The second layered material may be a dielectric material without any scintillation properties. It should be understood that the overall scintillator structure of the present invention creates scintillation in the same manner as a regular scintillator, and the radiation emission in step (4) is into the shaped-radiation that enables control over the emission direction and rate.

In some embodiments, none of the materials has all scintillation properties by itself, but the combined two materials may enable scintillation. The first layered material may thus be a heavy material selected to stop the input radiation, and the second layered material is selected to be capable of emitting an output optical signal of a predetermined range of wavelengths.

In some embodiments, the multilayer structure comprises more than two different materials, wherein one or more of the materials (or the combination of them) have scintillation properties.

The invention is not limited to any application and may be used with any scintillation-based detectors and/or emitters relating to any commercial application (e.g. all gamma-ray detectors, and X-ray detectors for their various applications in the market). The scintillator structure of the present invention can be integrated into current solutions (i.e. can be inserted instead of existing ones). Thus, an entire medical imaging device like a PET-Scan machine, need not be replaced. Furthermore, the configuration of the scintillator structure of the present invention allows reducing the price of existing highly-costly devices, since a smaller amount of scintillation material is used in the scintillator structure of the present invention, which is, in several applications, the most costly part of the device. Consequently, X-ray imaging and nuclear imaging can become less costly, require less radiation exposure, and provide higher resolution images. The invention is thus aimed at improving the detection and/or emission of X-ray photons and Gamma-ray photons by increasing the efficiency and time resolution of the scintillation. The technique of the present invention may also be used to enhance the detection or emission of energetic free electrons, when skipping step (1) of the scintillation process. The invention also provides an enhancement of radiation output with a required directionality (i.e. the emission rate is enhanced in some directions, but completely reduced in other directions). More specifically, the alternating-material scintillator structure is designed in terms of geometrical and optical properties, to force directional and faster radiation emission during the scintillation process. The directional emission enhances the number of detectable photons that are potentially detectable during the scintillation process, and thus enhances sensitivity in any scintillation-based application. The present invention thus enables to enhance the sensitivity and timing of a scintillator, or to produce the same signal with less radiation exposure, or with lower amounts of scintillation material.

The alternating-material scintillator structure carries a multilayer nanostructure (in one or more dimensions) having features on length scales comparable to the scintillation emission wavelength range (e.g. hundreds of nanometers or below). Each layered material in the multilayer nanostructure is in the emitted wavelength scale and is configured to manipulate the intrinsic radiation emission process in terms of rate and directionality, e.g. control and design of the emission according to the Purcell effect. This way, the scintillator's emission is enhanced into detectable directions, while inhibiting the undetectable scintillator emission. As a result, a photonically designed alternating-material scintillator reduces dramatically the number of undetectable, total internal reflected photons of the conventional isotopically emitting bulk scintillators. Control over the emission process of an emitter by the Purcell effect has never before been used in scintillators. According to the Purcell effect, the design of an optical structure around a pointlike, dipole emitter, can change the density of photonic states to enhance or suppress emission in specific directions and frequency ranges by the Purcell factor $F_P$. In case of a single dipole emitter in a cavity, the design rule of thumb is to increase the quality factor Q and to reduce the photonic mode volume V at the frequency of the emitter, since $F_P \propto Q/V$. In fact, in the late 1980s, Eli Yablonovitch had predicted in [8] that an example of an alternating structure, called a photonic crystal, could manipulate the process of radiation emission, and even completely reduce the Purcell factor. He proposed that such a medium could be made by carving voids into a dielectric material, where the material and voids had different refractive indices. However, this technique was only applied for atomic emitters or other localized emitters, rather than a large-scale bulk emitter such as a scintillator, whose localized luminescence centers are spread over all the 3D extended volume. Thus, the Q/V design rules are exactly the opposite of what is needed for a scintillation structure, since the luminescence centers span the entire scintillator volume, and a low Q is required for an efficient outcoupling. The scintillation structure of the present invention supports extended optical modes that outcouple efficiently to the surrounding optical environment (low Q and large V), while still being emitted at a high rate. The alternating-material scintillator structures can enhance both the efficiency η and the effective emission rates $\Gamma_{eff}$ (defined below) of the scintillation process. Varying the width of each layered material modifies the photonic band structure and thus control the photonic local density of states (LDOS) for each frequency and propagation angle (as well as polarization).

The design of the emission process can be implemented differently according to different purposes for which it is aimed. As an example, the multiplication between the efficiency and the emission rate of the detectable photons may be maximized. In a specific and non-limiting example, the layer width of each layered material may be determined to maximize the efficiency and the emission rate of the detectable photons by using an interior-point optimization algorithm, while fixing the environment and each material's refractive index. The material composition of the first and second layered materials, and the predetermined geometrical parameters of the multilayer nanostructure, are selected to create a certain Purcell factor enabling to (a) enhance the number of detectable emitted photons of the optical signal through control over the directionality of the optical signal emission, so that most of the emitted optical signal is detectable by a photodetector, and (b) enhance the rate of emission for the optical signal that is emitted in the preferred direction.

In some embodiments, at least one of each different material or the geometrical parameters of each layered material are selected according to the predetermined wavelength range of the emitted optical radiation.

In some embodiments, the first and second layered materials have certain respective thicknesses being selected such that the optical signal shape is altered inside the multilayer nanostructure to be concentrated mostly in the first layered material, in order to enhance the emission rate of the output optical signal.

In some embodiments, the multilayer nanostructure defines a three-dimensional volume.

In some embodiments, the multilayer nanostructure may comprise a patterned, or un-patterned, arrangement. The patterned arrangement may be periodic or not. The multilayer nanostructure may comprise an arrangement having a plurality of layers, each layer having a different width. The layered material arrangement may be one dimensional, two dimensional, or three dimensional. In this connection, it should be noted that the multilayer nanostructure can have varying sizes which are selected to correspond to the predetermined emission wavelength range and does not have to be formed by a repeating period. However, in some embodiments, the multilayer nanostructure may define a photonic crystal comprising a periodic structure having a period length being selected to correspond to the predetermined wavelength range. The period length is selected to be in the order of half the predetermined emission wavelength range.

According to another broad aspect of the present invention, there is also provided a detector system for detecting an input radiation. The detector system comprises a scintillator structure being as defined above and being configured and operable to collect most of the emitted optical signal.

According to another broad aspect of the present invention, there is also provided a method for emitting an output optical signal at a specific wavelength range. The method comprises selecting at least two layered materials having a different refractive index and at least two different material compositions; wherein at least one of each layered material, or a combination of both layered materials, define scintillation properties; selecting geometrical parameters of each layered material to control an emission rate of an output optical signal and a directionality of an optical signal emission, such that the output signal propagation direction is oriented along the one or more principal axes; exposing the at least two layered materials to an input radiation; and emitting an output optical signal at a specific wavelength range.

In some embodiments, selecting at least two layered materials having a different refractive index, at least two different material compositions and geometrical parameters of each layered material comprises creating a certain Purcell factor enabling to (a) enhance the number of detectable emitted photons of the optical signal through control over the directionality of the optical signal emission, so that most of the emitted optical signal is detectable by a photodetector, and (b) enhance the rate of emission for the optical signal that is emitted in the preferred direction.

In some embodiments selecting at least two layered materials having a different refractive index, at least two different material compositions and geometrical parameters of each layered material comprises increasing emission of some wavelengths of the output optical signal and reducing emission in others wavelengths of the output optical signal.

In some embodiments, selecting at least two layered materials having a different refractive index, at least two different material compositions and geometrical parameters of each layered material comprises selecting layered material allowing photoluminescence and/or phosphorescence and/or cathodoluminescence.

In some embodiments, exposing the at least two layered materials to an input radiation and emitting an output optical signal at a specific wavelength range comprises converting energetic particles to an optical signal of lower energy.

In some embodiments, exposing the at least two layered materials to an input radiation and emitting an output optical signal at a specific wavelength range comprises converting radiation from one wavelength range to another wavelength range by photoluminescence and/or phosphorescence and/or cathodoluminescence. Exposing the at least two layered materials to an input radiation may comprise exposing the at least two layered materials to at least one of X-ray photons, Gamma-ray photons, UV, energetic free electrons muons, or ions.

In some embodiments, emitting an output optical signal at a specific wavelength range comprises shaping a waveform of the output optical signal.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2A shows the emission rate enhancement for each in-plane momentum $k_x$ and wavelength, calculated for an infinite LYSO\air photonic crystal (PhC) with period D; FIG. 2B shows the total emission rate for the PhC and the outcoupled part as a function of emission angle, normalized by the bulk emission rate; FIG. 2C shows the total emission rate for the bulk and the outcoupled part as a function of emission angle;

FIG. 3A shows the number of detectable photons over time, normalized to the total number of detectable photons for a bulk scintillator with the same scintillation volume; FIG. 3B shows the coincidence time resolution (CTR) that correlates two detectors, measuring the arrival times of the first (detected) photon in each detector;

FIG. 5A shows enhancing scintillation by controlling the dipole orientation of the luminescence centers. FIG. 5B shows the overall enhancement of $\eta\Gamma_{eff}\tau_{d,0}$ as a function of the standard deviation (STD) of each scintillator layer width, for a different number of layered materials.

DETAILED DESCRIPTION OF EMBODIMENTS

Figure 1:
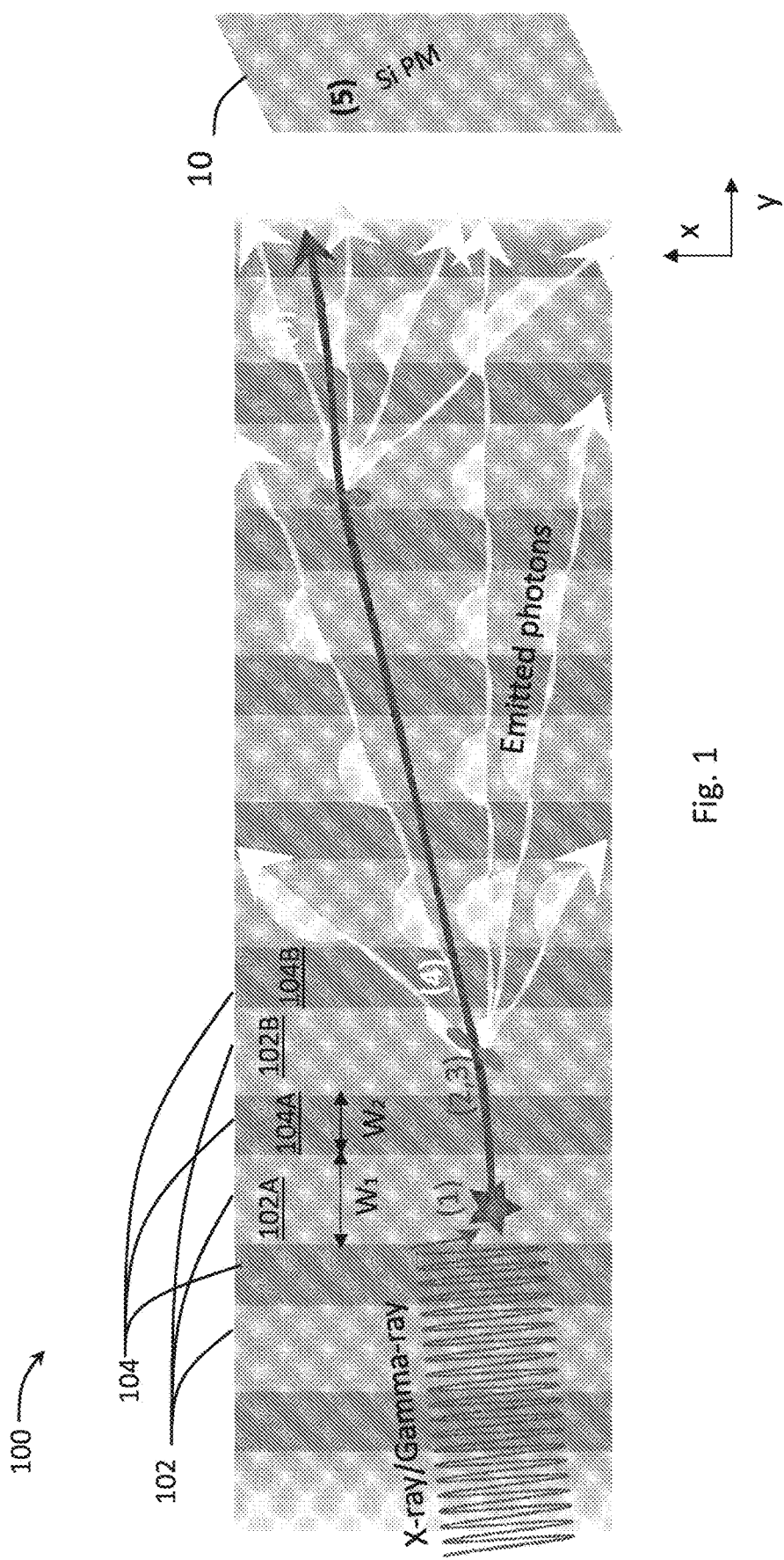
FIG. 1 show the process of detection and/or emission using the novel scintillator structure principles of the present invention; in particular, the five steps process is shown.

Reference is made to FIG. 1 showing schematically illustrating the novel scintillator structure of the present invention. The five detection steps mentioned above are illustrated together with the novel scintillator structure 100 of the present invention. Scintillator structure 100 comprises a multilayer nanostructure formed by at least one pair of alternating first and second layered materials 102 and 104 being arranged along one or more principal axes (Y axis in the present non-limiting example). In the figure, two pairs of alternating first and second layered materials 102 and 104 are marked, referred to 102A and 104A having respective width $W_1$ and $W_2$ and 102B and 104B, respectively. However, the invention is not limited to the number of pairs of alternating first and second layered materials 102 and 104. In this specific and non-limiting example, the first layered material 102 (shown in the figure in green) comprises a material composition having scintillation properties including stopping an input radiation and converting an input radiation into an output optical signal of a predetermined range of wavelengths. However, the invention is not limited to this configuration. The first and second layered materials may be interchangeable. Moreover, the combination of the layered materials having different material compositions may provide scintillation properties even if none of the materials has scintillation properties by itself. The material composition of first layered material 102 may thus be any known scintillation-based material or a combination of different materials having scintillation properties i.e. may cause the stopping of an input radiation while the second layered material 104 would emit the output optical signal.

The inventors found that a presence of a second layered material 104 (shown in the figure in purple) alternating with first layered material 102 enables to enhance the rate of optical signal creation and to control the directionality of the optical signal emission, as will be detailed further below. More specifically, by appropriately configuring both the first layered material 102 and the second layered material 104 i.e. their geometrical parameters and material composition, the emission rate of the output optical signal and the directionality of the optical signal emission can be controlled.

The following describes the five steps process of detection of a scintillator detector 10 used in the novel scintillator structure 100 of the present invention. In step (1), an incident energetic photon (x ray or γ ray) is stopped and its energy is converted by the scintillator material into a very energetic electron in layered material 102A which may propagate through layered material 104A while producing a large number of excited charge carriers along its path (step (2)), for example in the next layered material 102B. In step (3), the electron-hole pairs thermalize until reaching luminescence centers, and in step (4) radiatively recombine while emitting radiation only into the possible photonic modes of the structure. The charge carriers thus perform radiative emission. The novel scintillator structure of the present invention is configured so that most of these modes are coupled out and detected by a photodetector 10 (e.g., silicon photomultiplier).

In some embodiments, by alternating wavelength-size layers of a scintillator layered material 102 and a dielectric layered material 104, the photonic modes can be shaped, and the emission process can be controlled. As illustrated in the figure, the shape of the emitted optical signal is altered inside the multilayer nanostructure. The inventors found that by appropriately configuring dimensions of each one of the layered materials 104 the shape of the optical signal can be altered to be mostly in the first layered material 102. As shown in the figure, while the optical signal propagates towards detector 10, a large part of the optical signal represented by the yellow semi-circle is concentrated in the first layered material. Therefore, by changing the shape of the output signal, forcing the majority of the radiation beam to be concentrated in the scintillation layered materials, the rate of radiation creation can be enhanced. In addition, there are propagation directions where no radiation may be emitted for specific frequencies, so that all emission must occur in specific directions. In other words, scintillator structure 100 enhances the number of potentially extracted photons, and enhances the rate of radiation creation, by using artificially made materials with nanometer resolution, as compared with typical bulk scintillator detectors. Scintillator structure 100 comprises artificial nanophotonic structures, made from combinations of intrinsic scintillators with other dielectric materials, which can improve the scintillation efficiency and timing, compared to a bulk scintillator. Scintillator structure 100 is thus configured to enhance the scintillation rate and efficiency.

Figure 2A:
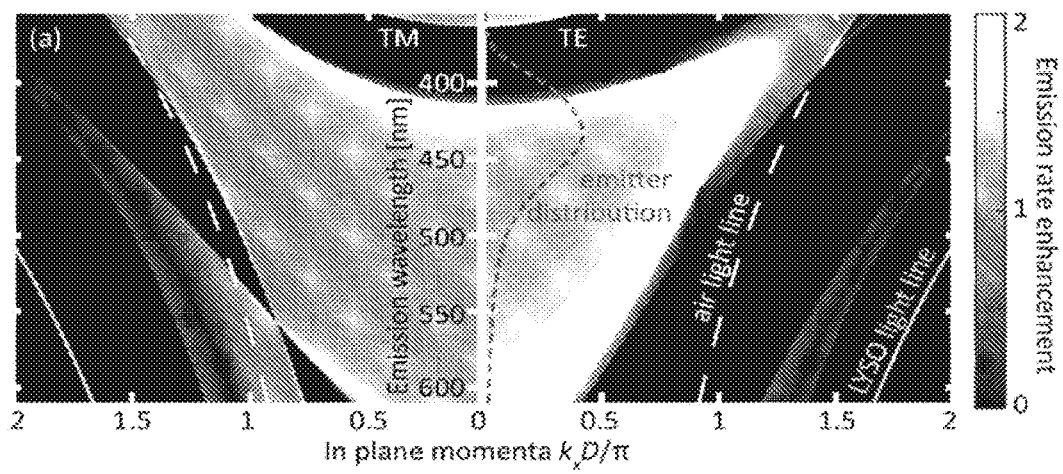
FIGS. 2A-2C show the multi-material scintillator emission features in a photonic-crystal example; in particular.
Figure 2B:
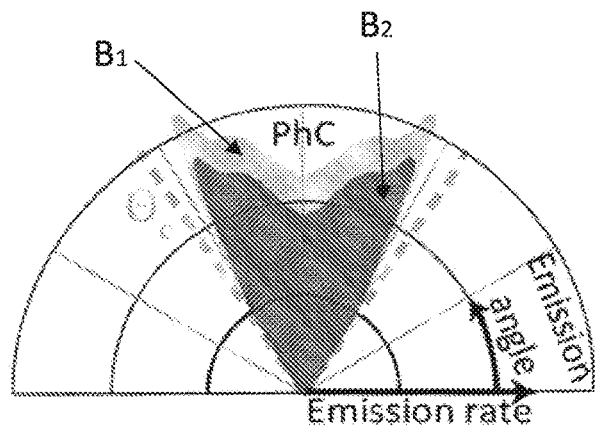

Moreover, as described above, the second layered material 104 (shown in the figure in purple) has a different refractive index as compared to first layered material 102. More specifically, the second layered material 104 may have a refractive index larger or smaller compared to the first layered material 102. More specifically, the interface between the two materials is such that the reflection created from the second layered material towards a first layered material determines the shape of the optical signal. Due to the difference between the refractive indices, the optical signal that is created in step (4) is designed to be emitted along specific directions (Y axis in this specific and non-limiting example) to maximize the number of photons that will reach the detector 10. This unique configuration of alternating two layered materials having different refractive indices, provides an enhancement of the emission rate in some directions, but completely reduces emission in other directions. In this connection, it should be noted that to obtain a total internal reflection from the first layered material 102 towards the second layered material 104, the refractive index of the first layered material 102 should be higher than the refractive index of the second layered material 104; this configuration will immediately cause an extensive reduction of the emission in the directions that are above the critical angle, as seen in FIGS. 2A, and 2B where there is almost no emission above the critical angle which is 33.7 degrees between LYSO:Ce and air. In step (5) the radiation is detected using scintillator detector 10 (e.g., silicon photomultiplier detector). The present invention also provides a detector system 10 to be used with scintillator structure 100. Due to the known directionality of the optical signal emitted by scintillator structure 100, detector system 10 is placed on the optical signal propagation path to collect the optical signal. The directional emission enhances the number of detectable photons that are produced during the scintillation process. Moreover, due to the faster radiation emission during the scintillation process, the time for the radiation to reach the detector system 10 is reduced.

For sake of illustration only, the multilayer nanostructure is in this example periodic and one dimensional. However, the invention is not limited to such configuration. Moreover, only a part of the first and second layered materials 102 and 104 is marked, however the number of layered the materials is not limited to the marked portions.

For example, such materials may be a 1D Photonic Crystal (PhC) being layered structures composed by a periodic stacking of a regular scintillation material (i.e. the first layered material) and another dielectric material (i.e. the second layered material) with different refractive indices. Photonic Crystal refers to a periodic structure that affects the shape of the optical signal, to be concentrated inside one of the two materials, when the geometrical size of each period is in the same order of magnitude as half of the wavelength. For example, a PhC that is structured by air (refractive index of 1) and silica (refractive index of 1.5), can have a period of 200 nm with equal spacing (100 nm air and 100 nm silica) to create a large impact on the shape of an optical signal which is with a wavelength of 400 nm when in vacuum. The scintillator structure may be patterned or not. If the scintillator structure is patterned, it is not limited to any specific patterning. For example, the materials can be patterned in 1D, 2D, or 3D. While a 1D PhC must be a layered structure, a 2D PhC may have a squared or cylindrical shape for one of the materials, or any other structure which is periodic in two dimensions and unchanged in the third dimension.

In a specific and non-limiting example, the multi-layer scintillator structure of the present invention may be configured as follows: a photonic crystal when the first layered material 102 may comprise 130 nm of LYSO(Ce) crystal scintillator (having a refractive index of n=1.81 and emission peak of 430 nm), while the second layered material 104 may comprise 150 nm of air (having a refractive index of n=1), when designed to be coupled to air (n=1).

In another specific and non-limiting example, the multi-layer scintillator structure of the present invention may be configured as follows: a photonic crystal when the first layered material 102 may comprise 130 nm of $Gd_2O_2S$:Tb ceramic scintillator (having a refractive index of n=2.3 and emission peak of 545 nm), while the second layered material 104 may comprise 130 nm of silica having a refractive index of n=1.5, when designed to be coupled to a silica waveguide or optical grease (having a refractive index of n=1.5).

In another specific and non-limiting example, the scintillator structure of the present invention may be configured as follows: a non-periodic structure where the first layered material 102 comprises $KMgF_3$ phosphor material with widths of 35,51,82 nm while the second layered material 104 comprises $TiO_2$ with widths of 20,23,18,21 nm, when designed to couple with air and sit on a silica substrate (having a refractive index of n=1.5). In this example, the emission is in the UV range.

In some embodiments, the multi-layer scintillator structure may be configured such that the Compton energetic electron can directly emit radiation through a Cherenkov process and thereby skip steps (3,4) described above. Similar to the emission by a dipole in a luminescence center, the Cherenkov process can also be enhanced by shaping the optical signal with similar fabrication methods as that of the present invention. However, different design algorithms must be used to optimize the Cherenkov radiation in terms of directionality.

In some embodiments, the multi-layer scintillator structure also improves the conversion of the Compton electron to electron-hole pairs by faster and more efficient thermalization. This phenomenon occurs when the second layered material 104 may include special plasmonic optical modes. Thus, instead of a thermalization via many phonons, thermalization via fewer plasmons might be possible, so that, overall, more e-h pairs would be produced. Thus, the total efficiency of that conversion could be improved since the number of electron-hole pairs determines the number of emitted photons. In addition, the time of the electron-hole pair creation process must be decreased since additional relaxation channels are introduced, which will reduce the rise time and improve detection in time-dependent applications (such as PET scans).

Figure 2C:
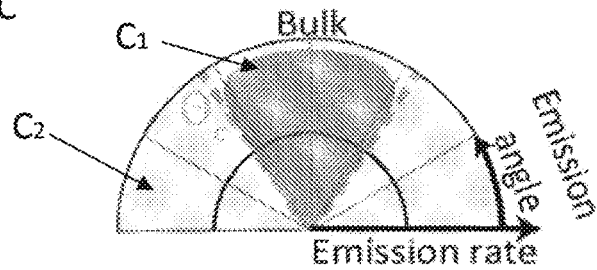
Figure 3B:
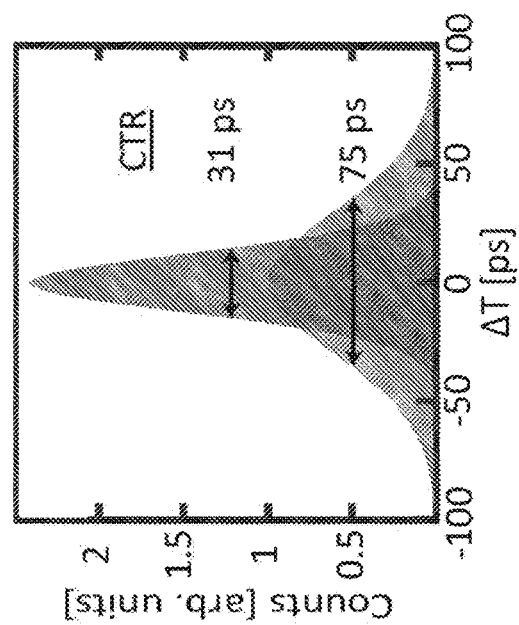
FIGS. 3A-3B show examples of an improved signal due to the multi-material scintillator structure of the present invention; in particular
Figure 3A:
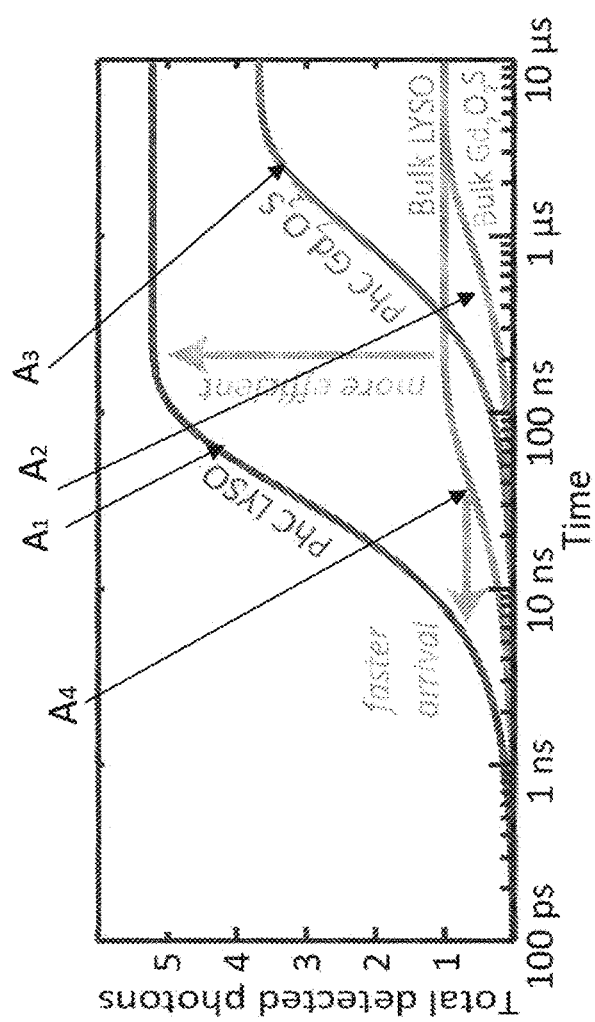

Reference is made to FIGS. 3A-3B, showing a non-limiting example of a 1D LYSO:Ce and air 1D PhC of widths of 130 and 150 nm, respectively. In this configuration of the scintillator structure of the present invention, the rate of step (4) is enhanced by a factor of 1.2, simultaneously with the emission becoming more directional so that the number of emitted photons into relevant directions is enhanced by a factor of 5. In other words, a factor of 5 enhancement in outcoupling efficiency was shown for a one-dimensional (1D) photonic crystal (PhC) structure of FIG. 1, i.e., a medium made from periodically alternating layered materials, made from a multi-layer scintillator structure. The optimization of the sizes and materials is determined by the emitted radiation frequency and can be optimized using the technique described further below. For example, for an emission distribution plotted in dashed in FIG. 2A, the layered material size optimization was done by maximizing the produced emission rate enhancement and the extracted photon enhancement. More specifically, FIG. 3A shows the total number of photons that reach the detector over time. The scintillator structure enables a faster emission on one hand, and more photons overall that reach the detector on the other hand. FIG. 2B shows an emission rate versus the angle of emission. The regular emission shown in FIG. 2C is generated into all directions, while the scintillator structure emission is generated only into detectable directions which are below the critical angle θc defined by the interface between the scintillator material and the air. Due to the interface between the scintillator structure and the air, not all emitted photons reach the detector. FIG. 2A shows the spectral and angular emission rate enhancement, $P_F(\omega, \theta)$. The size of the scintillator structure layered materials is optimized so that the emission rate enhancement overlaps the emitter distribution (dashed curve).

However, as described above, the scintillator structure configuration is not limited to any particular dimension or material. The scintillator structure of the present invention may comprise any artificial material patterned on scales of the optical emitted wavelength range. This material can be properly patterned on scales of the optical wavelength. This includes also 2D and 3D periodic structures and 3D printed structures that the scintillation material is poured inside. The inventors developed the technique for calculating the optimal pattern considering emission into relevant directions also including the number of emitted photons and emission rate enhancement in the relevant frequency range.

For calculating the new effective emission rate for the novel scintillator structure, the inventors developed the following equation Eq. (1):

$$\Gamma_{eff} = \frac{\int d\omega Y(\omega) \int_0^{\frac{\pi}{2}} \sin(\theta) d\theta \int dz \sum_\lambda T^\lambda(z, \theta, \omega) P_F^\lambda(z, \omega, \theta) \Gamma_0^\lambda(z, \omega, \theta)}{\int d\omega Y(\omega) \int_0^{\frac{\pi}{2}} \sin(\theta) d\theta \int dz \sum_\lambda T^\lambda(z, \theta, \omega)} \tag{1}$$

when $P_F^\lambda(z, \omega, \theta)$ is the Purcell factor, plotted in FIG. 2A, $\Gamma_0^\lambda(z, \omega, \theta)$ describes the regular bulk emission rate for polarization λ, location z, emission frequency ω and direction θ and $T^\lambda(z, \theta, \omega)$ is the transmission coefficient from the scintillator into the outside air. The factor $T^\lambda(z, \theta, \omega)$ allows the counting only of emission into relevant directions, while Y(ω) describes the spectral distribution of the emitters (see dashed curve in FIG. 2A) that allows the counting of the emission rate enhancement in the relevant frequency range. For example, if the Purcell factor is 2 in all locations, frequencies and polarizations, but in angles 15 to 45 degrees while 0 in other angles, while the regular emission rate is 4 ns$^{-1}$ and the transmission coefficient is 1 between 0 and 30 degrees and zero for all other angles, the effective emission rate is $$\Gamma_{eff} = \frac{\int_{\frac{\pi}{12}}^{\frac{\pi}{6}} \sin(\theta) d\theta \times 2 \times 4}{\int_0^{\frac{\pi}{6}} \sin(\theta) d\theta} \text{ns}^{-1} \cong 5.96 \text{ ns}^{-1},$$

which leads to an effective emission rate enhancement of less than 1.5.

Using the design of the Purcell factor, the novel scintillator structure can be configured such that the emission is generated only in the directions which eventually reach the detector (e.g. Silicon Photomultiplier) (step 5). This way, the overall number of photons that reach step (5) may be largely enhanced by a factor of beyond 5, as seen in FIG. 1B.

For calculating this factor, the inventors developed the following general formula:

$$\eta = \frac{\text{\# of emitted photons that reach the detector}}{\text{regular \# of emitted photons that reach the detector}} = \tag{2}$$

$$\frac{\left(\int d\omega Y(\omega) \int_0^{\frac{\pi}{2}} \sin(\theta) d\theta \int dz \sum_\lambda T^\lambda(z, \theta, \omega) P_F^\lambda(z, \omega, \theta)\right)}{\left(\int d\omega Y(\omega) \int_0^{\frac{\pi}{2}} \sin(\theta) d\theta \int dz \sum_\lambda P_F^\lambda(z, \omega, \theta) \Gamma_0^\lambda(z, \omega, \theta)\right)} \Big/ \frac{\Gamma_0^\lambda(z, \omega, \theta)}{\left(\int d\omega Y(\omega) \int_0^{\frac{\pi}{2}} \sin(\theta) d\theta \sum_\lambda T_0^\lambda(\theta, \omega) \Gamma_0^\lambda(z, \omega, \theta)\right) \Big/ \left(\int d\omega Y(\omega) \sum_\lambda \Gamma_0^\lambda(z, \omega, \theta)\right)}$$

For example, using the same Purcell factors and transmission coefficients as before:

$$\eta = \frac{\left(\int_{\frac{\pi}{12}}^{\frac{\pi}{6}} \sin(\theta) d\theta\right) \left(\int_{\pi/12}^{\frac{\pi}{4}} \sin(\theta) d\theta\right)}{\int_0^{\frac{\pi}{6}} \sin(\theta) d\theta} = 2.89$$

In Equations 1 and 2, the Purcell factor refers to a specific structure. Thus, the technique of the present invention is completely general for every structure manipulating the optical environment inside the scintillator.

To calculate the Purcell factor, the following may be done: the emission rate of a local dipole d, located in $r_0$, may be calculated by the formula (modified from [9], Eq. 8.115):

$$\Gamma_{dipole\ approx}(r_0; \omega_{eg}) = \frac{2\omega_{eg}^2}{\epsilon_0 \hbar c^2} \text{Im}\left[\overleftrightarrow{G}_{dd}(r_0, r_0; \omega_{eg})\right] |d|^2, \tag{3}$$

where $\overleftrightarrow{G}_{dd}$ is the dyadic Green's function elements in the dipole's direction and $\omega_{eg}$ is the emission frequency. The dipole size |d| and frequency were assumed as not changing as a function of its location or orientation, and thus the enhancement occurs solely due to the enhancement of the imaginary part of the dyadic Green's function in the location of the dipole. The dyadic Green's function includes the whole description of the optical properties of the structure and is unique for each structure and materials. Overall, the Purcell factor would be the ratio between Eq. (4) and the emission rate in the material, as if it were infinite.

Reference is made to FIG. 3A illustrating the number of detectable photons over time, normalized to the total number of detectable photons for a bulk scintillator with the same scintillation volume. The results of a LYSO:Ce/air PhC with the emission coupled out to air are shown in $A_1$ and of a Gd2O2S:Tb=SiO2 PhC with the emission coupled out to SiO2 in $A_3$. The structure of the present invention enables more detectable photons with a faster emission rate. The right edge of the plot shows that the efficiency can be enhanced by a factor of above 5, which also improves the scintillation sensitivity and the energy resolution. The configuration shown in FIG. 1 is thus particularly useful for applications in which both the time resolution and efficiency are important, such as time-of-flight PET and other time-of-flight detection in particle accelerators. In these applications, the spatial resolution is determined by the variance of the first photon arrival time, called the coincidence time resolution (CTR), found by the short-time signal in FIG. 3B. FIG. 3B shows the coincidence time resolution (CTR) that correlates two detectors, measuring the arrival times of the first (detected) photon in each detector. The CTR determines the resolution for PET scans and other time-of-flight applications. In this specific and non-limiting example, the PhC structure enhances the CTR by a factor of 2.2.

Reference is made to FIGS. 4A-4E showing non-limiting possible examples of different scintillator structures configured to optimize the process of radiation emission in terms of rate, and efficiency through directionality. The configuration of the structure's geometrical features and materials can be done to optimize the emission into any desired direction. Examples of other geometries include scintillation cylinders in a dielectric material or dielectric cylinders in a scintillation material (2D PhC), or alternating cubes of a scintillator and another material. The scintillator structure may be periodic or not. The geometrical features of the scintillator structure should be smaller than the emitted radiation wavelength range which are designed for directional and faster emission.

Figure 4A:
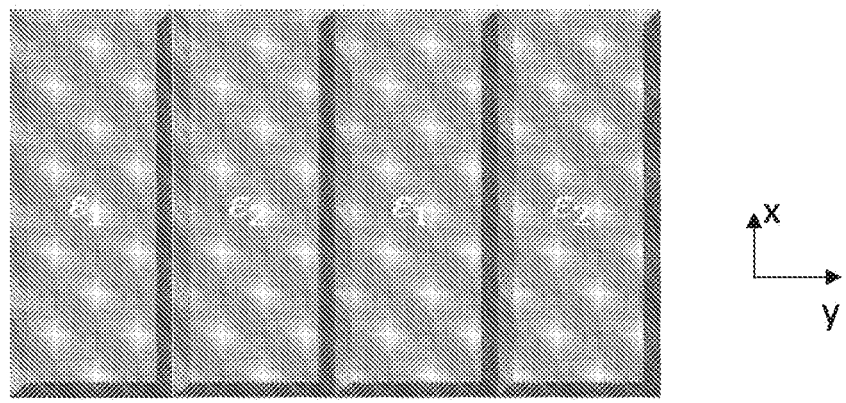
FIGS. 4A-4E schematically illustrate different possible patterns being carried by the novel scintillator structure of the present invention.
Figure 4B:
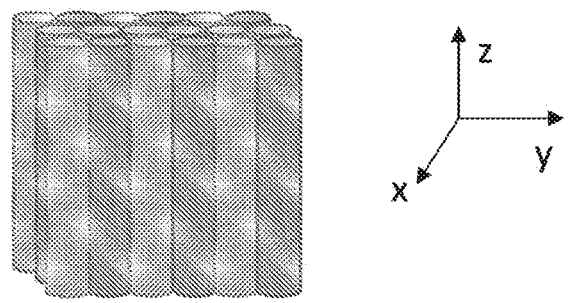
Figure 4C:
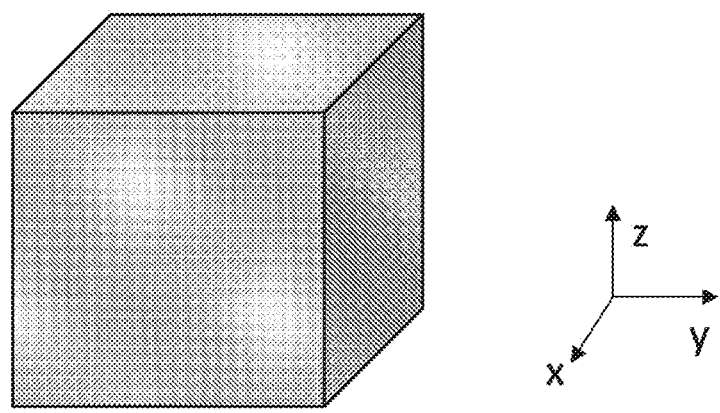

For example, the scintillator structures may be a 1D, 2D or 3D periodic structure. The period length should be in the order of half of the wavelength of the emitted radiation. Exact lengths of the period depend on the refractive index of each material, the wavelength range of emission, and which material the radiation is emitted from. FIG. 4A shows a 1D periodic layered structure formed by alternating materials along a specific principal axis V. FIG. 4B shows a 2D periodic structure formed by alternating materials along two specific axes (z, y) where the geometrical features can determine a dominant emission direction (which could be perpendicular to the rods). FIG. 4C shows a 3D media, with a specific unit cell that is periodically reproduced in all 3 directions. For example, 3D printing (especially with nanoscribe) may be used for fabricating the structures with nanoscale features. 3D printing may also be used to print the scintillation material(s). For example, a certain material having certain geometrical features defining some holes may be printed, and then a liquid scintillator may fill the holes.

Figure 4D:
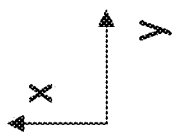
Figure 4D:
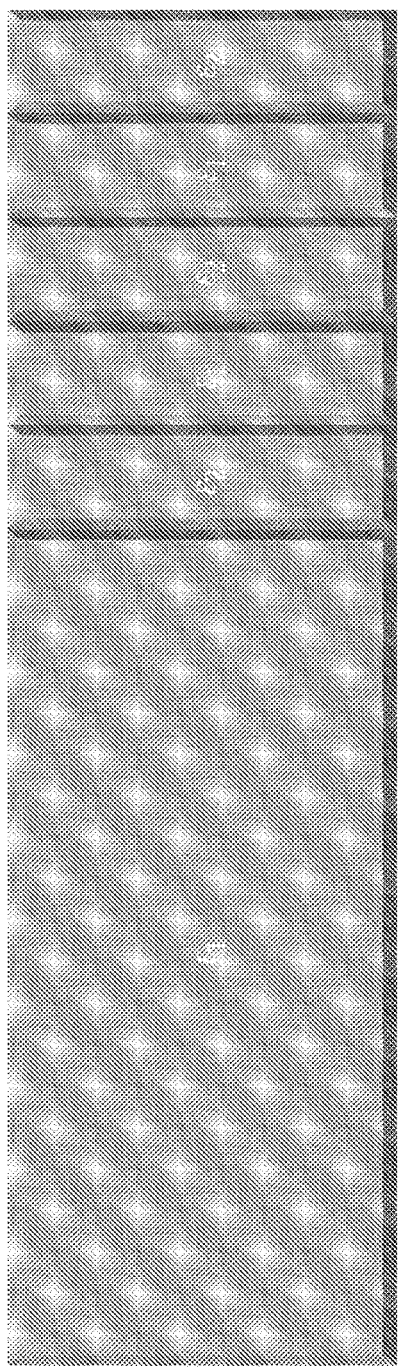
Figure 4E:
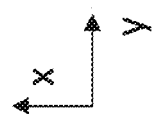
Figure 4E:
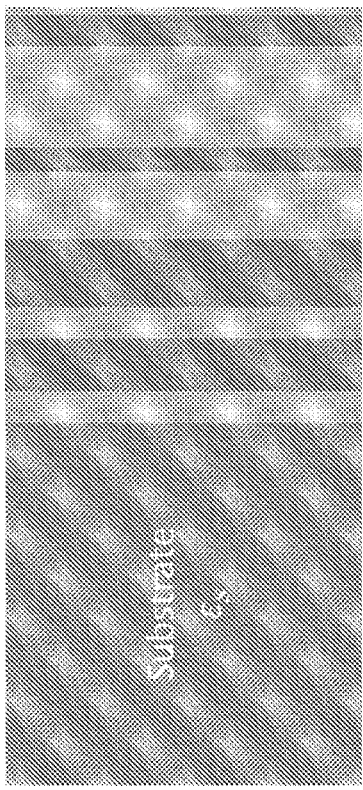

FIG. 4D and FIG. 4E show a 1D non-periodic layered structure formed by alternating materials along a specific axis V. In some embodiments, as illustrated in 4D, the multi-layer scintillator structure may be embedded as part of an un-patterned scintillator (e.g. on top, below, or inside). In this case, the total thickness of the nanoscale patterned scintillation material is small but may be useful to provide an early signal in addition to regular detection. This early signal might be sufficient for a large improvement in applications for looking at the earliest signal, such as PET scans.

An additional important extension is to combine two layered materials, neither of which has all the scintillation properties, though together they form a scintillation structure. For example, the one material may be a heavy material for good radiation stopping, such as LYSO without dopants. The second material may be a good emitter for a fast emission rate such as a GaAs/InGaAs quantum dots. Consequently, the heavy material produces many electron-hole pairs that reach the fast emitter (for example by applying voltage) and produce radiation which will be emitted to a specific direction due to the geometrical features that will be designed according to this proposal. Thus, this structure will be a hybridized scintillator with optimized parameters in terms of radiation stopping, emission rate, and energy conversion efficiency.

In a specific and non-limiting example, the hybridized scintillator structure of the present invention may be configured as follows: first layered material 102 may comprise a LYSO layer without doping (having a refractive index of n=1.81) combined with a second layered material 104 comprising a GaAs/InGaAs quantum dot layer (having a refractive index of n=3.37). The emission peak, and with it the specific geometrical features of each layer, is determined by the quantum dot size.

Reference is made now to FIGS. 2A-2C showing a multi-layer photonic-crystal scintillator emission features and the compared bulk scintillator emission features. More specifically, FIG. 2A shows the emission rate enhancement for each in-plane momentum and wavelength, calculated for an infinite LYSO\air PhC with period D. The emission rate is calculated by averaging over the locations and random polarization of the luminescence centers in the entire structure. The geometrical features of the structure are optimized to fit the emitter spectral distribution (dashed cure). FIG. 2B shows the total emission rate for the PhC in $B_1$ and the outcoupled part in $B_2$ as a function of emission angle, normalized by the bulk emission rate. In the structure of the present invention, the emission is created below the critical angle θc, and thus the efficiency is enhanced. FIG. 2C shows the total emission rate for the bulk in $C_1$ and the outcoupled part in $C_2$ as a function of emission angle. The emission into angles beyond the critical angle θc is undetectable. The effective emission rate enhancement of the structure of the present invention is the ratio between the area in $B_2$ and the area in $C_2$.

For each emission wavelength, the photonic band structure shows emission enhancement to some angles and emission reduction into other angles. By optimizing the structure of the present invention, the enhanced angles may be matched to ones that efficiently outcouple, and the inhibited angles to ones that do not outcouple. The structure of the present invention is configured so that the local density of states (LDOS) of the detectable modes is increased, while the LDOS of the undetectable modes is minimized. FIG. 2A shows how an optimized photonic structure imposes the largest emission rate enhancement exactly at the peak of the emitter's spectral distribution.

FIG. 2B presents the emission rate enhancement per emission angle, obtained once multiplying the result in FIG. 2A by the spectral distribution and integrating over frequency. It was found that inside the structure of the present invention, almost all created radiation propagates below the critical angle. Compared to the emission features in a bulk structure as shown in FIG. 3C, the efficiency of the entire scintillation process is enhanced by a factor of 5, shown by comparing the ratio between the detectable photon emission ($B_2$ and $C_2$) to the total emission ($B_1$ and $C_2$). Moreover, the larger rate of detectable photons relates to more outcoupled photons per second and lead to a 15% larger effective emission rate ($B_2$ compared to $C_2$).

Figures 5A, 5B:
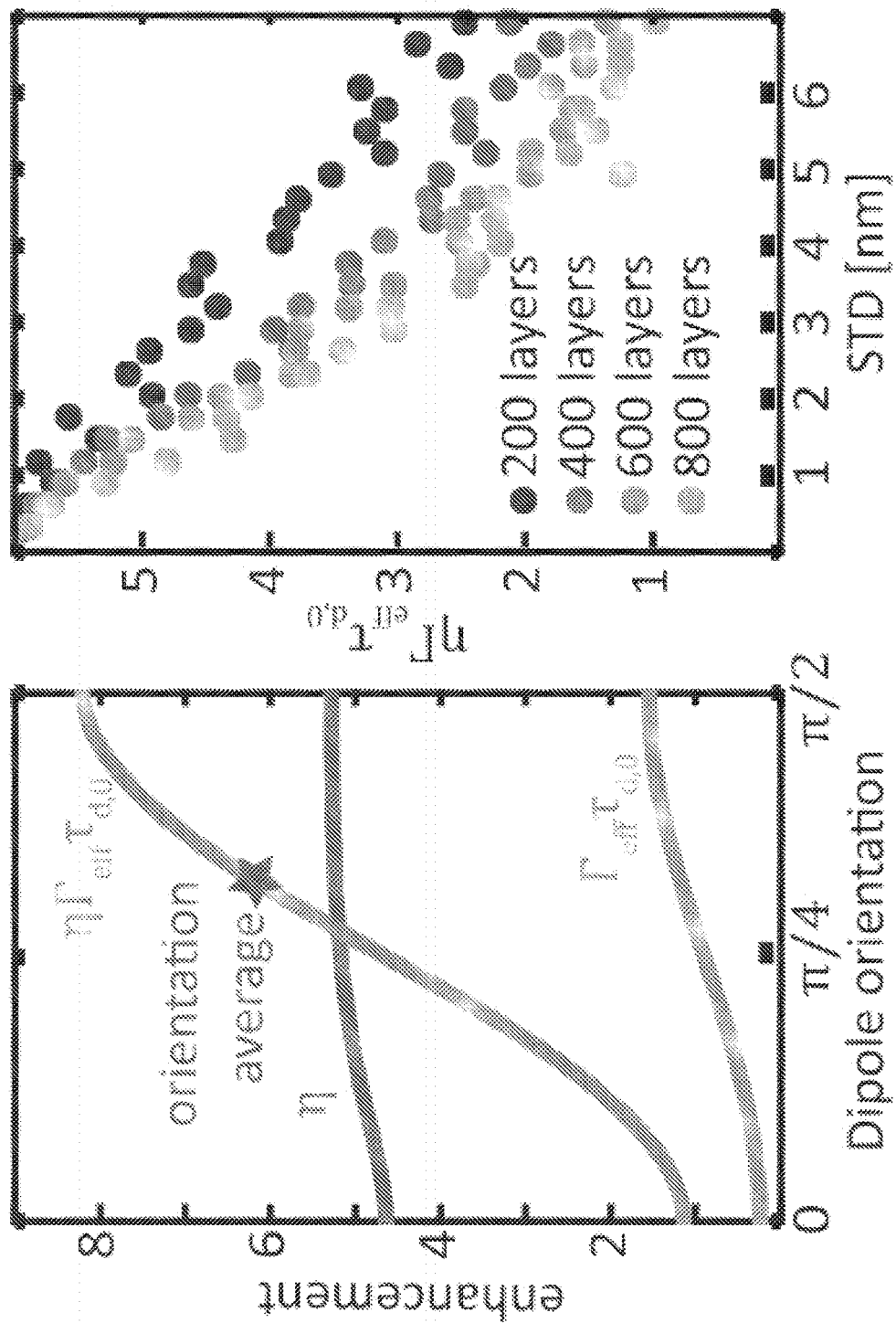
FIGS. 5A-5B show the control and robustness of an example of a photonic-crystal scintillator configured according to the teachings of the present invention; in particular.

The concept of a Purcell-enhanced scintillator can be extended in various ways. Instead of randomly oriented dipoles, a control over the dipole orientation of the luminescence centers can significantly improve the scintillation. Such control can be achieved, for example, by using perovskite platelets with emitters in which the dipole moments are all aligned. FIG. 5A shows that even without further optimization of the structure that was used in FIG. 2, the emission rate can increase by almost a factor of 2 for an in-plane oriented dipole, so that $\eta\Gamma_{eff}\rho_{d,0}$ is increased by more than a factor of 8 (with $\rho_{d,0}$ being the bulk scintillator decay time). FIGS. 5A-5B show the control and robustness of the photonic-crystal scintillators created according to the teachings of the present invention. More specifically, FIG. 5A shows enhancing scintillation by controlling the dipole orientation of the luminescence centers. The plot shows the efficiency $\eta$, and effective emission rate $\Gamma_{eff}$ normalized by $\rho_{d,0}$ as a function of the dipole orientation relative to the z axis for the structure from FIG. 1, When the dipoles are oriented in the in-plane direction (angle $\pi/2$), the effective emission rate is enhanced, leading to an overall enhancement factor of above 8. In addition to the improved design when the dipole is strictly oriented to one axe, an improved performance can be done if the scintillation material has a narrower emission spectrum.

FIG. 5B shows the overall enhancement of $\eta\Gamma_{eff}\rho_{d,0}$ as a function of the standard deviation (STD) of each LYSO layer width, for a different number of layers. As the randomness increases, Anderson localization reduces the transmission of radiation, and the overall response decreases. For some applications, multiple layers must be created, for example, up to 10000 layers (each being submicron in thickness) to stop $\gamma$ rays. FIG. 4B shows the fabrication tolerance needed to keep the photonic crystal properties. When increasing the standard deviation (STD) of each layer thickness, optical Anderson localization becomes an important factor in the configuration, so that the transmission of radiation and its outcoupling efficiency decrease. Moreover, when increasing the number of layers, the allowed STD reduces. Nevertheless, such accurate configurations have been achieved in optical components (e.g., accurate bandpass filters) using several thin-film growth methods and applied for various applications such as angular selective filters. Other methods have shown consistent thicknesses over hundreds (and even thousands) of layers using polymer-stretching techniques. These nanofabrication techniques, combined with additional micromachining techniques (as chemical etching), can be used with scintillator materials or dopants to form the scintillator nanostructures.

Table 1 below shows the simulation parameters used in each figure above. The refractive indices of the scintillator layered materials, the other dielectric layers, and the surrounding material, are denoted by $n_1$, $n_2$, and $n_{ext}$, respectively. $d_{1,2}$ denote the width of the scintillator layered material and of the dielectric layer, respectively.

TABLE 1

| FIGS. | $n_1$ | $n_2$ | $n_{ext}$ | Optimization parameter | $d_1$ [nm] | $d_2$ [nm] |
|---|---|---|---|---|---|---|
| FIG. 2A-2B, FIGS. 3A-A1, 3B | 1.81 | 1 | 1 | $\eta\Gamma_{eff}$ | 130 | 150 |
| FIG. 2A-A3 | 2.3 | 1.5 | 1.5 | $\eta\Gamma_{eff}$ | 130 | 130 |
| FIG. 5A | 1.81 | 1 | 1 | — | 130 | 150 |
| FIG. 5B | 1.81 | 1 | 1 | — | 130 ± rand(x) | 150 |

Other improvements of the Purcell-enhanced scintillator concept include configurations of 2D and 3D PhC, or even more complex structures that can be created using 3D printers. Noticeably, the structure of the present invention can also improve additional channels that convert input radiation to output radiation, such as the fast photon emission of Cherenkov radiation. In typical hulk materials, Cherenkov radiation is emitted when an energetic particle moves faster than the speed of radiation in the material, however in PhC structures this condition is modified significantly and can provide additional ways to enhance the Cherenkov signal.

As described above, the novel structure of the present invention may be integrated into or combined with any possible device in the field of medical imaging, such as radiography (e.g. Computed Tomography (CT) machines, quantitative computed tomography, coronary CT angiography, coronary CT calcium scan, contrast CT, dual-energy X-ray absorptiometry, projectional radiography, contrast radiography, fluoroscopy, angiography etc.) or nuclear medicine (e.g. positron emission tomography (PET) machines, time-of-flight PET, single photon emission CT (SPECT)). When used with PET scans for example, by enhancing the emission rate and also number of emitted photons, the novel structure of the present invention enables enhancing the resolution in the space of the cancer location, or reducing the dose of radioactive materials injected to the patient. Used with CT scans for example, by enhancing the number of emitted photons, the novel structure of the present invention enables reduction of X-ray dose for the patient, or an enhancement in the resolution of the computed image.

The novel structure of the present invention may also be integrated into or combined with any possible device in the field of nuclear cameras for nuclear safety (e.g. Gamma camera or scintillation camera, scintigraphy, radiation tolerance cameras). By enhancing the number of emitted photons, the novel structure of the present invention enables enhancement of sensitivity in terms of energetic resolution, identification between nuclear sources, and reducing the threshold for detection.

The novel structure of the present invention may also be integrated into or combined with any possible device in the field of X-ray security in airports, borders, underground tunnels (e.g. people X-ray scanning, parcel, baggage and small cargo X-ray inspection, preventive detection systems, cargo and vehicle X-ray inspection). By enhancing the number of emitted photons, the novel structure of the present invention enables reduction of X-rays used, which enhances the safety for users and reduces power consumption, since less X-rays are needed.

The novel structure of the present invention may also be integrated into or combined with any possible device in the field of electron microscope cameras used in labs and fabrication facilities (e.g. based CCD as silicon production) or ultrafast X-ray imaging. When used with electron cameras for electron microscopes for example, by enhancing the number of emitted photons, the novel structure of the present invention enables reduction of the power consumption of the electron microscopes to obtain more detectable photons with less energetic electron pulses. When used with ultrafast X-ray imaging for example, by enhancing the emission rate, the novel structure of the present invention enables enhancing the overall process timing which enhances the repetition rate, and thus the number of frames per second.

The novel structure of the present invention may also be integrated into or combined with any possible device in the field of Gamma-ray burst detectors for exploring distant galaxies; particle accelerator facilities; microtomography (Micro-CT); night vision cameras based on ambient light intensifiers, or X-ray spectrometers for material science. When used with Gamma-ray burst detectors for example, by enhancing the number of emitted photons, the novel structure of the present invention enables reducing the number of Gamma-rays that need to reach the detector, thus enhancing the probability of detection and classification between galaxies. When used with X-ray spectrometers for example, by enhancing the number of emitted photons, the novel structure of the present invention enables enhancement of energetic resolution and identification of different materials.

The novel structure of the present invention may also be integrated into or combined with any possible device in the field of high-energy particle detectors in accelerator facilities such as CERN. By enhancing the emission rate and also the number of emitted photons, the novel structure of the present invention enables enhancing the time resolution of the particle creation, while enhancing also energetic resolution and identification.

In each application, whether medical or industrial, the scintillator configuration can be optimized using the principles of the present invention. For example, the efficiency can be optimized for applications such as SPECT or γ-ray burst detectors, where the emission rate is not a consideration. Medical applications can also exploit the larger number of photons per excitation to enable a lower X-ray dose or reduce the amount of radioactive material used. Alternatively, the scintillator configuration can be optimized to increase the scintillation signal and thus reduce the treatment duration or reduce the power consumption of X-ray machines by using lower X-ray flux or energy. Finally, the results shown here can reduce the amount of costly scintillation material by replacing part of it with another material, while maintaining (or increasing) the total scintillation emission.

In such embodiments, the novel structure of the present invention may also be integrated into or combined with any possible device in the field of UV sources. This may be implemented by configuring the multi-layer scintillator structure to be formed by a phosphor material which emits in the UV range, combined with a dielectric material. Such a structure can be excited by a high-energy UV excitation, for example at a wavelength of 140 nm, and emit the output radiation at a wavelength of 220 nm. In addition, since the phosphor emission spectra usually span a small range of wavelengths, the multi-layer structure can provide a significant effect, even with a small number of layers.

In such embodiments, the novel structure of the present invention may also be integrated into or combined with any possible device in the field of visible or infra-red sources. This may be implemented by configuring the multi-layer scintillator structure to be formed by a phosphor material that emits light in the visible or infra-red range combined with a dielectric material. Such a structure can be excited by a high-energy UV excitation, electrical current (Electroluminescence), or by free electrons that are generated by a photocathode (used for example in infra-red viewers).

The invention claimed is:

1. A method for emitting an output optical signal at a specific wavelength range comprising:
    selecting at least two layered materials having a different refractive index and at least two different material compositions; wherein none of each layered material has all scintillation properties by itself,
    determining at least one angle of emission to thereby control the directionality of the optical signal emission and to fit detectable directions, wherein the at least one angle of emission is below a critical angle defined by an interface between at least one of the two layered materials and the air;
    calculating an emission rate enhancement;
    calculating an optimal pattern including simulation parameters considering the at least one angle of emission, a number of emitted photons and an emission rate enhancement in a particular frequency range; wherein the simulation parameters comprise the refractive indices of the at least two layered materials, the width of the at least two layered materials for the calculated emission rate enhancement to maximize the efficiency and the emission rate of the detectable photons;
    varying the width of each layered material to modify the photonic band structure and thus control the photonic local density of states (LDOS) for each frequency and propagation angle and the polarization; wherein each layer of the plurality of layers has a different width;
    selecting geometrical parameters of each layered material to control an emission rate of an output optical signal and a directionality of an optical signal emission; wherein at least one of each different material composition or the geometrical parameters of each layered material are selected according to the specific wavelength range of the emitted output optical signal;
    optimizing the geometrical parameters of each layered material to fit an emitter spectral distribution;
    exposing the at least two layered materials to an input radiation; and
    emitting an output optical signal at a specific wavelength range.

2. The method of claim 1, wherein the material compositions and geometrical parameters of each of at least two layered materials having a different refractive index are selected so as to create a certain Purcell factor enabling to (a) enhance the number of detectable emitted photons of the optical signal through control over the directionality of the optical signal emission as compared to the number of detectable emitted photons of an optical signal emitted by a bulk scintillator detector, so that most of the emitted optical signal is detectable by a photodetector, and (b) enhance the rate of emission for the optical signal that is emitted in the preferred direction as compared to the rate of emission for an optical signal emitted by a bulk scintillator detector.

3. The method of claim 1, wherein selecting at least two layered materials having a different refractive index, at least two different material compositions and geometrical parameters of each layered material comprises increasing emission of some wavelengths of the output optical signal and reducing emission in other wavelengths of the output optical signal.

4. The method of claim 1, wherein selecting at least two layered materials having a different refractive index, at least two different material compositions and geometrical parameters of each layered material comprises selecting layered material allowing photoluminescence and/or phosphorescence and/or cathodoluminescence.

5. The method of claim 1, wherein exposing the at least two layered materials to an input radiation and emitting an output optical signal at a specific wavelength range comprises converting energetic particles to an optical signal of lower energy.

6. The method of claim 1, wherein exposing the at least two layered materials to an input radiation comprises exposing the at least two layered materials to at least one of X-ray photons, Gamma-ray photons, UV, energetic free electrons muons, or ions.

7. The method of claim 1, wherein emitting an output optical signal at a specific wavelength range comprises shaping a waveform of the output optical signal by selecting certain respective thicknesses to a first and second layered material such that the output optical signal shape is altered inside the multilayer nanostructure to be concentrated mostly in the first layered material.

\* \* \* \* \*